(12) United States Patent
Hathaway et al.

(10) Patent No.: US 7,075,936 B2
(45) Date of Patent: Jul. 11, 2006

(54) VOICE PACKET PROCESSOR AND METHOD OF OPERATION THEREOF

(75) Inventors: Michael W. Hathaway, Austin, TX (US); David P. Sonnier, Austin, TX (US); Leslie Zsohar, Round Rock, TX (US)

(73) Assignee: Agere Systems, Inc., Allentown, PA (US)

( * ) Notice: Subject to any disclaimer, the term of this patent is extended or adjusted under 35 U.S.C. 154(b) by 938 days.

(21) Appl. No.: 10/001,654

(22) Filed: Oct. 31, 2001

(65) Prior Publication Data

US 2002/0126677 A1 Sep. 12, 2002

Related U.S. Application Data

(60) Provisional application No. 60/245,416, filed on Nov. 2, 2000.

(51) Int. Cl.
*H04L 12/28* (2006.01)
*H04L 12/56* (2006.01)

(52) U.S. Cl. .................... 370/395.64; 370/395.52; 370/474; 370/401; 370/466

(58) Field of Classification Search ............... 370/352, 370/356, 396.1, 395.6, 396, 905, 401, 474, 370/395.52, 395.64, 466
See application file for complete search history.

(56) References Cited

U.S. PATENT DOCUMENTS 5,940,393 A * 8/1999 Duree et al. ............... 370/392
6,075,798 A * 6/2000 Lyons et al. ............... 370/474
6,747,977 B1 * 6/2004 Smith et al. ........... 370/395.64
2002/0057676 A1 * 5/2002 Cohen-Adiv et al. ....... 370/352

OTHER PUBLICATIONS

Sriram et al, Voice Packetization and Compression in Broadband ATM Networks,Apr. 1991, IEEE Journal on selected areas in communications, vol. 9 No. 3,pp. 294-304.*
Omundsen et al, A pipelined, Multiprocessor Architecture for a Connectionless Server for Boradband ISDN,Apr. 1994, IEEE ACM Transactions on Networking, vol. 2 No. 2,pp. 181-191.*

* cited by examiner

*Primary Examiner*—Ricky Q. Ngo
*Assistant Examiner*—Venkatesh Haliyur (57) ABSTRACT

A voice packet processor for use with voice applications employing a fast pattern processor (FPP) and a routing switch processor (RSP) that receive and transmit protocol data units (PDUs) and a method of operation thereof. In one embodiment, the voice packet processor includes (1) a voice packet controller (VPC) configured to receive the PDUs from the FPP and queue the PDUs for processing, (2) a voice packet parser configured to receive the PDUs that are ATM adaptation layer 2 (AAL2) cells containing voice data from the VPC, parse the AAL2 cells into at least one Common Part Sublayer (CPS) packet and transmit the at least one CPS packet to the RSP, and (3) a voice packet assembler configured to receive the PDUs that are CPS packets from the VPC, assemble the CPS packets into at least one AAL2 Cell and transmit the at least one AAL2 cell to the RSP.

33 Claims, 5 Drawing Sheets

VOICE PACKET PROCESSOR AND METHOD OF OPERATION THEREOF

CROSS-REFERENCE TO PROVISIONAL APPLICATION

This application claims the benefit of U.S. Provisional Application No. 60/245,416 entitled "VOICE PAYLOAD PROCESSOR" to Leslie Zsohar, et al., filed on Nov. 2, 2000, which is commonly assigned with the present invention and incorporated herein by reference as if reproduced herein in its entirety.

CROSS-REFERENCE TO RELATED APPLICATIONS

This application is related to U.S. patent application Ser. No: 9/798,472, filed Mar. 2, 2001 and titled "A VIRTUAL REASSEMBLY SEGMENTATION SYSTEM AND METHOD OF OPERATION THEREOF,"and U.S. patent application Ser. No: 09/822,655, filed on Mar. 30, 2001 and titled "A VIRTUAL SEGMENTATION SYSTEM AND METHOD OF OPERATION THEREOF." The above-listed applications are co-pending with the present invention and are incorporated herein by reference as if reproduced herein in their entirety.

TECHNICAL FIELD OF THE INVENTION

The present invention is directed, in general, to network processors and, more specifically, to a voice packet processor and method of operating the same.

BACKGROUND OF THE INVENTION

Telecommunications is currently undergoing a revolution brought about by the explosive growth of Internet traffic. Behind this growth are the millions of new users, demand for richer content like multimedia and the migration of voice and data traffic onto the Internet and associated backbone networks. Increasingly, voice traffic will be carried on new Internet Protocol (IP) networks and Asynchronous Transfer Mode (ATM) networks.

In fact, the public switched telephone network ("PSTN") is evolving rapidly from a closed system to an open network architecture that will enable telecommunication carriers to differentiate themselves with new service offerings provided by open software platforms. Users are demanding more service flexibility along with reliability equivalent to current PSTNs. Also, telecommunication carriers are reluctant to discard billions of dollars of legacy equipment. However, the telecommunication carriers realize that the PSTNs will need to evolve to handle the demands of today's users.

To take advantage of digital network capabilities, telecommunication carriers are employing carrier class voice gateway products to transform PSTNs into a more flexible, scalable solution that can accommodate the increasing data traffic. Carrier class voice gateway products are typically positioned between a Class 5 central office switch and the packet or cell-based digital network that carries the traffic. Two main functions of the carrier class voice gateways are to set up the call based on the signaling protocol used and to convert the time division multiplexed (TDM) voice samples into data packets or cells.

Currently, the dominant formats for carrying voice on digital networks employing carrier class voice gateways include Voice of IP (VoIP), Voice over ATM (VoATM) using ATM Adaptation Layer 2 (AAL2) and VoATM using AAL1. Currently available systems can apply the required headers needed for VoIP processing and perform the segmentation and reassembly (SAR) functions needed for VoATM using AAL1. However, implementing SAR functions for VoATM using AAL2 has additional complexities and increased processing requirements due to the protocol and format of AAL2. The ATM networks themselves also impose additional timing constraints due to the speed requirements associated with cell transmission. Current carrier class voice gateways have not been able to overcome the complexities of AAL2 and the timing requirements to implement segmentation and reassembly functions for AAL2.

Accordingly, what is needed in the art is a system to overcome the deficiencies of the prior art.

SUMMARY OF THE INVENTION

To address the above-discussed deficiencies of the prior art, the present invention provides a voice packet processor for use with voice applications employing a fast pattern processor and a routing switch processor that receive and transmit protocol data units (PDUs) and a method of operating the same. In one embodiment, the voice packet processor includes a voice packet controller configured to receive the PDUs from the fast pattern processor and queue the PDUs for processing. The voice packet processor further includes a voice packet parser configured to receive the PDUs that are Asynchronous Transfer Mode (ATM) adaptation layer 2 (AAL2) cells containing voice data from the voice packet controller, parse the AAL2 cells into at least one Common Part Sublayer (CPS) packet and transmit the at least one CPS packet to the routing switch processor. Additionally, the voice packet processor includes a voice packet assembler configured to receive the PDUs that are CPS packets from the voice packet controller, assemble the CPS packets into at least one AAL2 Cell and transmit the at least one AAL2 cell to the routing switch processor.

In another embodiment, the present invention provides a method of operating a voice packet processor for use with voice applications employing a fast pattern processor and a routing switch processor that receive and transmit protocol data units (PDUs) that includes: (1) receiving in a voice packet controller the PDUs from the fast pattern processor and queuing the PDUs for processing, (2) receiving in a voice packet parser the PDUs that are Asynchronous Transfer Mode (ATM) adaptation layer 2 (AAL2) cells containing voice data from the voice packet controller, parsing the AAL2 cells into at least one Common Part Sublayer (CPS) packet and transmitting the at least one CPS packet to the routing switch processor, and (3) receiving in a voice packet assembler the PDUs that are CPS packets from the voice packet controller, assembling the CPS packets into at least one AAL2 Cell and transmitting the at least one AAL2 cell to the routing switch processor.

The present invention also provides, in one embodiment, a carrier class voice gateway that includes a fabric interface controller that interfaces with a fabric network to send and receive asynchronous transfer mode adaptation layer 2 (AAL2) cells and protocol data units (PDUs), and a digital signal processing (DSP) module that digitizes and stores received voice communications in Common Part Sublayer (CPS) packets, and converts the CPS packets to transmit voice communications. The carrier class voice gateway further includes a packet processing system that interfaces with the DSP module and the fabric interface controller to send and receive the CPS packets, the AAL2 cells or the PDUs.

The packet processing system includes a fast pattern processor (FPP) that receives the CPS packets, the AAL2 cells or the PDUs, and performs pattern recognition and classification on the CPS packets, the AAL2 cells or the PDUs. The packet processing system further includes a voice packet processor having: (1) a voice packet controller that receives the CPS packets, the AAL2 cells or the PDUs from the FPP and queues the CPS packets, the AAL2 cells or the PDUs for processing, (2) a voice packet parser that receives the AAL2 cells containing voice data from the voice packet controller, parses the AAL2 cells into at least one CPS packet and transmits the at least one CPS packet, and (3) a voice packet assembler that receives the CPS packets from the voice packet controller, assembles the CPS packets into at least one AAL2 cell and transmits the at least one AAL2 cell.

Additionally, the packet processing system includes a routing switch processor (RSP) that receives the at least one CPS packet, the at least one AAL2 cell or the PDUs from the voice packet processor, performs routing functions and/or traffic management, transmits the at least one CPS packet to the DSP module, and transmits the at least one AAL2 cell or the PDUs to the fabric interface controller. For purposes of the present invention, the use of "or" means one or the other or a combination thereof.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
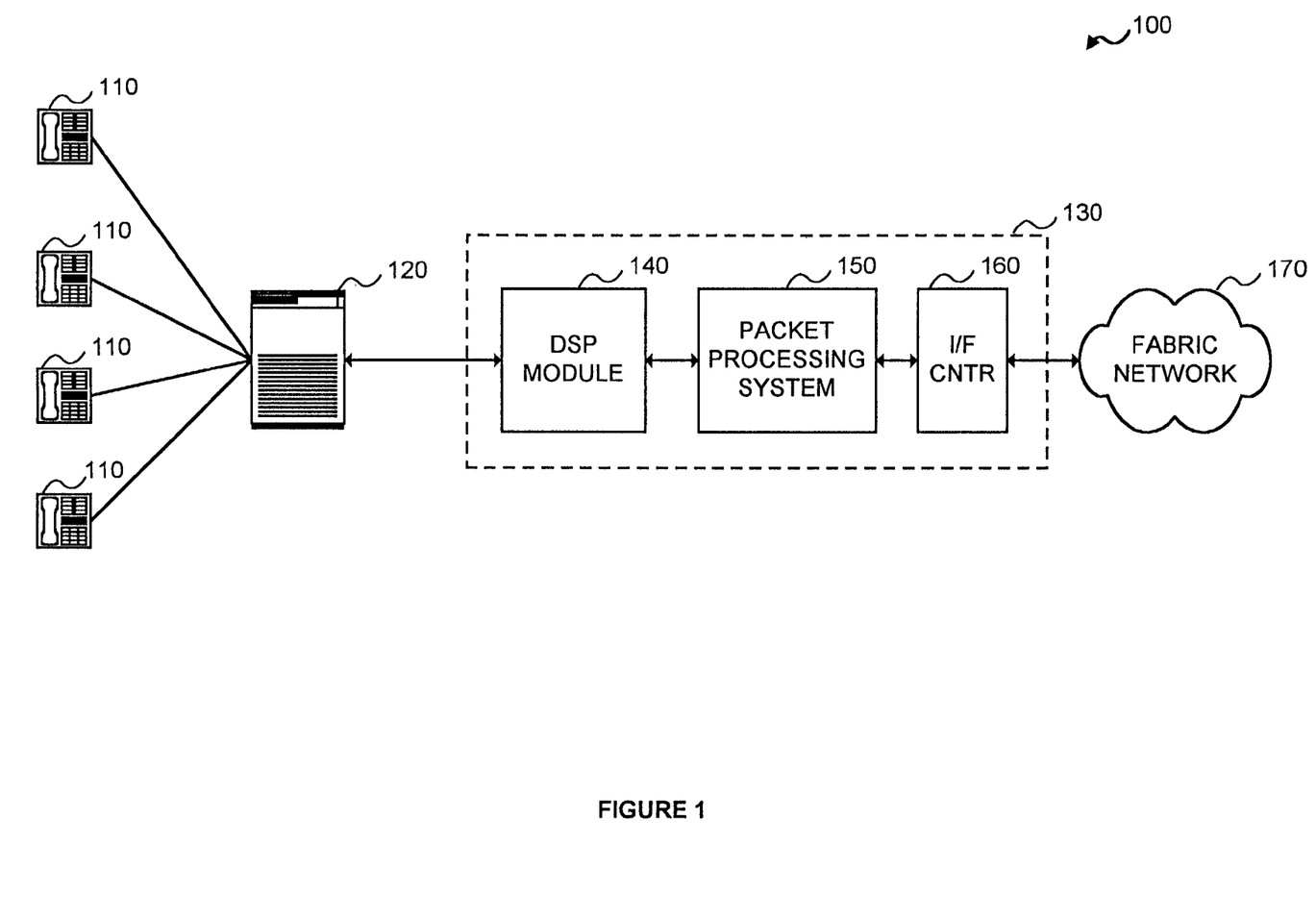
FIG. 1 illustrates a block diagram of a telecommunication network employing an embodiment of a carrier class voice gateway constructed in accordance with the principles of the present invention.

Referring initially to FIG. 1, illustrated is a block diagram of a telecommunication network, generally designated 100, employing an embodiment of a carrier class voice gateway 130 constructed in accordance with the principles of the present invention. The telecommunications network 100 is generally designed to receive and transmit voice communications through the network 100.

As illustrated, the telecommunications network 100 includes telephone devices 110, a central office switch 120, the carrier class voice gateway 130 and a fabric network 170. The central office switch 120 is a conventional central office switch and is coupleable to the telephone devices 110. In another embodiment, the central office switch 120 is a conventional class 5 central office switch. The telephone devices 110 may be conventional plain old telephone stations (POTS) and the cental office switch 120 may be connected to any number of the telephone devices 110.

The carrier class voice gateway 130 is configured to interface with the central office switch 120 employing signaling protocols and send and receive voice communications, such as time division multiplexed (TDM) voice samples. The signaling protocol may be used by the central office switch 120 and the carrier class voice gateway 130 to set up and tear down calls. In one embodiment the signaling protocol may be Signaling System No. 7 (SS7). For purposes of the present invention, the phrase "configured to" means that the device, the system or the subsystem includes the necessary software, hardware, firmware or a combination thereof to accomplish the stated task.

The carrier class voice gateway 130 is also configured to convert voice communications to and from data packets or cells, and transmit and receive data packets or cells to and from a fabric network 170. The fabric network 170 may be any type of digital network such as an Asynchronous Transfer Mode (ATM) network. The fabric network 170 may also comprise multiple digital networks of the same type or combination of types of digital networks.

In the illustrated embodiment, the carrier class voice gateway 130 includes a digital signal processing (DSP) module 140, a packet processing system 150 and a fabric interface controller 160. The DSP module 140 is configured to digitize and store received voice communications in Common Part Sublayer (CPS) packets. See FIG. 2 for a description of CPS packets. The fabric interface controller 160 is configured to interface with the fabric network 170 to send and receive ATM adaptation layer 2 (AAL2) cells and protocol data units (PDUs). For purposes of the present invention, the term "protocol data units" are packets or cells that make up a unit of data associated with a specific protocol. The packet processing system 130 is configured to interface with the DSP module 140 and the fabric interface controller 160 to send and receive CPS packets, AAL2 cells and PDUs. The packet processing system 130 is further configured to perform classification, segmentation and reassembly and routing functions on the CPS packets, AAL2 cells and PDUs. See FIG. 4 for a more detailed description of an embodiment of the packet processing system 130.

Figure 2:
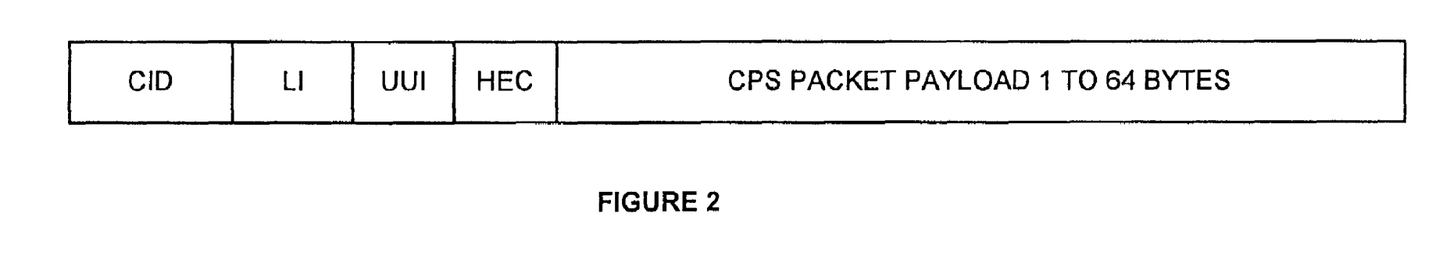
FIG. 2 illustrates a CPS packet structure used with voice communications.

Turning now to FIG. 2, illustrated is a CPS packet structure used with voice communications. The CPS packet structure consists of two basic sections: header and payload. The first section is the header and includes a channel identifier, a length indicator, a user-to-user indication and a header error control. Table 2.1 describes the contents of the CPS packet header of FIG. 2.

TABLE 2.1

CPS Packet Header

| Field | Num Bits | Description |
| --- | --- | --- |
| CID | 8 | Channel Identifier - Zero is not allowed (reserved for PAD identification) |
| LI | 6 | Length Indicator - set to one less than the number of octets in the CPS packet payload. |
| UUI | 5 | User-to-User Indication - 24 and 31 represent management (Type 3) packets. |
| HEC | 5 | Header Error Control |

The second section includes the payload of the CPS packet. The payload can contain 1 to 64 bytes of data, such as digitized voice communications. Background information concerning CPS packets is discussed in "ATM Theory and Applications," by David E. McDysan and Darren L. Spohn, McGraw-Hill (Signature ed. 1998) and "ATM Volume 1, Foundation for Broadband Networks," by Uyless D. Black, Prentice-Hall ($2^{nd}$ ed. 1999), and both are incorporated herein by reference.

Figure 3A:
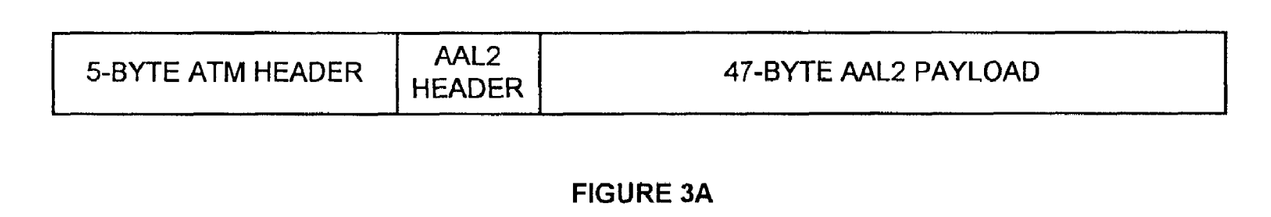
FIG. 3A illustrates an ATM cell structure for AAL2 type cells used in ATM networks.

Turning now to FIG. 3A, illustrated is an ATM cell structure for AAL2 type cells used in ATM networks. AAL2 type cells are typically used for voice traffic over an ATM network, commonly called Voice over ATM (VoATM). Of course, however, the present invention is not limited to ATM cells for voice traffic. Nor is the present invention limited to AAL2 type cells containing just voice traffic. In other embodiments, the present invention may also process AAL2 type cells containing voice data, multimedia data or a combination thereof.

The ATM cell structure for an AAL2 type cell consists of three basic sections: an ATM header, an AAL2 header and a payload. The first section is the ATM header, which is the standard ATM cell header, and consists of 5 bytes. Table 3.1 describes the contents of the ATM header of FIG. 3A.

TABLE 3.1

ATM Header

| Field | Num Bits | Description |
| --- | --- | --- |
| GFC | 4 | Generic Flow Control |
| VPI | 8 | Virtual Path Identifier |
| VCI | 16 | Virtual Channel Identifier |
| PT | 3 | Payload Type |
| CLP | 1 | Cell Loss Priority |
| HEC | 8 | Header Error Check |

The ATM header identifies a destination, a cell type, and a priority. The destination is identified by the combination of the Virtual Path Identifier (VPI) and the Virtual Channel Identifier (VCI). The Generic Flow Control (GFC) field allows a multiplexer to control the rate of an ATM terminal. In another embodiment, the entire GFC field or a portion of the GFC field may be used as part of the VPI field in order to increase the number of possible VPI values. The Payload Type (PT) indicates whether the ATM cell contains user data, signaling data, or maintenance information. The Cell Loss Priority (CLP) bit indicates the relative priority of the cell. Lower priority cells are discarded before higher priority cells during congested intervals. Also, the Header Error Check (HEC) detects and corrects errors in the ATM header.

Figure 3B:
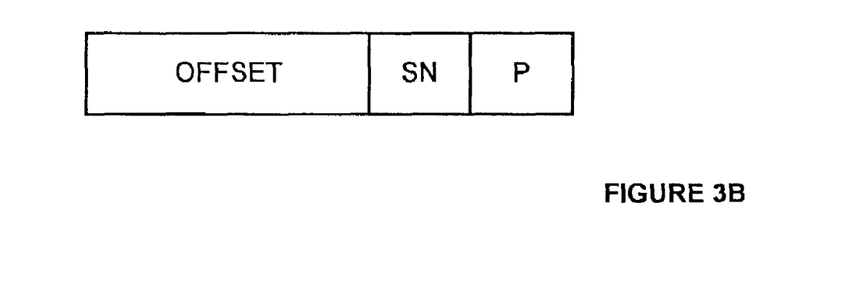
FIG. 3B illustrates an AAL2 header structure of the AAL2 type cell of FIG. 3A.

The second section of the AAL2 cell is the AAL2 header and is described in FIG. 3B. The final section of the AAL2 cell is the payload. The payload is 47-bytes and contains data, such as the CPS packet of FIG. 2 or a portion of the CPS packet. In standard ATM cells, each ATM cell has a fixed size of 53-bytes of which 5-bytes is the ATM header and 48-bytes is the payload. AAL2 cells, however, use one byte of the payload for an AAL2 header, which reduces the payload to 47-bytes. Background information concerning ATM cells and AAL2 type cells are discussed in "ATM Theory and Applications," by David E. McDysan and Darren L. Spohn, McGraw-Hill (Signature ed. 1998) and "ATM Volume 1, Foundation for Broadband Networks," by Uyless D. Black, Prentice-Hall ($2^{nd}$ ed. 1999).

Turning now to FIG. 3B, illustrated is an AAL2 header structure of the AAL2 type cell of FIG. 3A. The AAL2 header includes an offset, a sequence number (SN) and an odd parity bit (P). Table 3.2 describes the contents of the AAL2 header of FIG. 3B.

TABLE 3.2

AAL2 Header

| Field | Num Bits | Description |
| --- | --- | --- |
| Offset | 6 | The number of bytes between the header of the CPS packet header and either the start of a CPS Packet, or the start of the PAD field in the payload. |
| SN | 1 | Sequence Number - alternating 0 and 1 |
| P | 1 | Odd Parity |

AAL2 type cells that are used for voice traffic typically have CPS packets stored in the 47-byte AAL2 payload field. However, since a CPS packet contains data that can vary from 1-byte to 64-bytes and the AAL2 type cell has a maximum of 47-byte for data, multiple AAL2 type cells may be used to transmit one CPS packet. For example, if one CPS packet contains 64-bytes of digitized voice data, the first AAL2 type cell contains the CPS header of 3-bytes and the first 44-bytes of the CPS payload. The second AAL2 type cell contains the remaining 20-bytes of the CPS payload. The second AAL2 type cell's payload still has 27 bytes of payload available. Instead of transmitting the second AAL2 type cell with its payload partially used, a second CPS packet is used to fill the remaining payload of the second AAL2 type cell. For purposes of the present invention, this second AAL2 type cell is a Multi-packed AAL2 cell. Multi-packed AAL2 cells can contain multiple CPS packets depending upon the size of the CPS payload. Additionally, if an AAL2 type cell's AAL2 payload is not completely used and the AAL2 type cell is to be transmitted, the remaining portion of the AAL2 payload is padded with zeros to maintain the correct ATM cell size.

Figure 4:
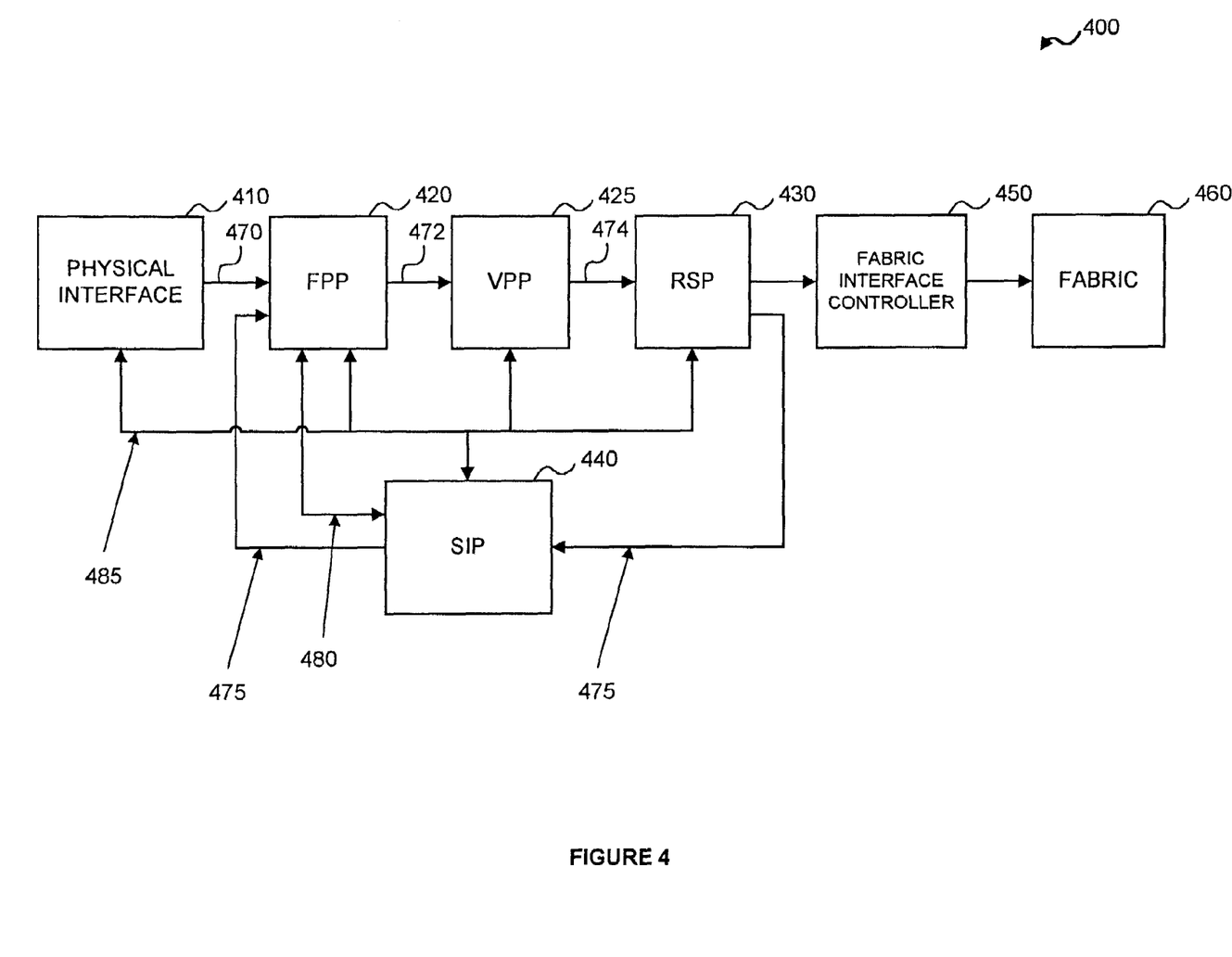
FIG. 4 illustrates a block diagram of an embodiment of a packet processing system architecture constructed in accordance with the principles of the present invention.

Turning now to FIG. 4, illustrated is a block diagram of an embodiment of a packet processing system architecture, generally designated 400, constructed in accordance with the principles of the present invention. The packet processing system architecture 400, in one embodiment, may be employed in the carrier class voice gateway illustrated in FIG. 1. The packet processing system architecture 400 provides a unique hardware and software combination that delivers high-speed processing for multiple communication protocols with full programmability. The unique combination provides the programmability of traditional reduced instruction set computing (RISC) processors with the speed that, until now, only application-specific integrated circuit (ASIC) processors could deliver.

In the embodiment shown in FIG. 4, the packet processing system architecture 400 includes a physical interface 410, a fast pattern processor (FPP) 420, a voice packet processor (VPP) 425, a routing switch processor (RSP) 430, and a system interface processor (SIP) 440. The packet processing system architecture 400 may also include a fabric interface controller 450 which is coupled to the RSP 430 and a fabric network 460. It should be noted that other components not shown may be included within the packet processing system architecture 400 without departing from the scope of the present invention.

The physical interface 410 provides coupling to an external network or a device. In an exemplary embodiment, the physical interface 410 is a POS-PHY/UTOPIA level 3 interface. The FPP 420, in one embodiment, may be coupled to the physical interface 410 and receives a data stream that includes PDUs, CPS packets, AAL2 cells or a combination thereof from the physical interface 410. The FPP 420 analyzes and classifies the PDUs, CPS packets and AAL2 cells and subsequently concludes processing by outputting packets to the VPP 425.

The FPP 420, in conjunction with a powerful high-level functional programming language (FPL), is capable of implementing complex pattern or signature recognition and operates on the processing blocks containing those signatures. The FPP 420 has the ability to perform pattern analysis on every byte of the payload plus headers of a data stream. The pattern analysis conclusions may then be made available to a system logic or to the VPP 425 and the RSP 430, allowing processing block manipulation and queuing functions. The FPP 420, the VPP 425 and the RSP 430 provide a solution for switching, routing, segmentation and reassembly. The FPP 420 further provides glueless interfaces to the VPP 425, the RSP 430 and the SIP 440 to provide a complete solution for wire-speed processing in next-generation, terabit switches and packet processing systems.

As illustrated in FIG. 4, the FPP 420 employs a first communication link 470 to receive the data stream from the physical interface 410. The first communication link 470 may be an industry-standard UTOPIA Level 3/UTOPIA Level 2/POS-PHY Level 3 interface. Additionally, the FPP 420 employs a second communication link 472 to transmit packets and conclusions to the VPP 425. The second communication link 472 may be a POS-PHY Level 3 interface.

The FPP 420 also includes a management path interface (MPI) 475, a function bus interface (FBI) 480 and a configuration bus interface (CBI) 485. The MPI 475 enables the FPP 420 to receive management frames from a local microprocessor. In an exemplary embodiment, this may be handled through the SIP 440. The FBI 480 connects the FPP 420 and the SIP 440, or custom logic in certain situations, for external processing of function calls. The CBI 485 connects the FPP 420 and other devices (e.g., physical interface 410, VPP 425 and RSP 430) to the SIP 440. Other interfaces (not shown), such as memory interfaces, are also well within the scope of the present invention.

The FPP 420 provides an additional benefit in that it is programmable to provide flexibility in optimizing performance for a wide variety of applications and protocols. Because the FPP 420 is a programmable processor rather than a fixed-function ASIC, it can handle new protocols or applications as they are developed as well as new network functions as required. The FPP 420 may also accommodate a variety of search algorithms. These search algorithms may be applied to large lists beneficially.

The VPP 425 works in concert with the FPP 420 and the RSP 430 to process PDUs, CPS packets and AAL2 cells classified by the FPP 420. The VPP 425, in one embodiment, has the capability to generate and terminate AAL2 cells, covert between CPS packets and AAL2 cells, and perform CPS packet switching. The AAL2 cells and/or the CPS packets are then sent to the RSP 430 for any additional processing that may be required. The VPP 425 may also bypass processing on the PDUs and send the PDUs along with the classification information to the RSP 430. Additionally, the VPP 425 employs a third communication link 474 to transmit packets, cells and conclusions to the RSP 430. The third communication link 474 may be a POS-PHY Level 3 interface.

The RSP 430 is also programmable and works in concert with the FPP 420 and VPP 425 to process the PDUs classified by the FPP 420, and the CPS packets and AAL2 cells processed by the VPP 425. The RSP 430, in one embodiment, uses the classification information received from the FPP 420 and the VPP 425 to determine the starting offset and the length of a PDU's payload, which provides the classification conclusion for the PDU. The classification information may be used to determine the port and the associated RSP 430 selected for the PDU. The RSP 430 may also receive additional PDU information passed in the form of flags for further processing.

The RSP 430 also provides programmable traffic management including policies such as random early discard (RED), weighted random early discard (WRED), early packet discard (EPD) and partial packet discard (PPD). The RSP 430 may also provide programmable traffic shaping, including programmable per queue quality of service (QoS) and class of service (CoS) parameters. The QoS parameters include constant bit rate (CBR), unspecified bit rate (UBR), and variable bitrate (VBR). Correspondingly, CoS parameters include fixed priority, round robin, weighted round robin (WRR), weighted fair queuing (WFQ) and guaranteed frame rate (GFR).

Alternatively, the RSP 430 may provide programmable packet modifications, including adding or stripping headers and trailers, rewriting or modifying contents, adding tags and updating checksums and CRCs. The RSP 430 may be programmed using a scripting language with semantics similar to the C language. Such script languages are well known in the art. Also connected to the RSP 430 are the fabric interface controller 450 and the fabric network 460. The fabric interface controller 450 provide the physical interface to the fabric network 460, which is typically a communications network.

In another embodiment, the RSP 430 may be connected to the physical interface 410 or a device (not shown) in addition to the fabric interface controller 450. In this embodiment, the RSP 430 may employ both the physical interface 410 and/or the fabric interface controller 450 to send and receive PDUs, CPS packets, AAL2 cells or a combination thereof. In a related embodiment, the physical interface 410 and the fabric interface controller 450 may be the same device. In yet another embodiment, the physical interface 410 and the fabric interface controller 450 may be coupled to the same device or network.

The SIP 440 allows centralized initialization and configuration of the FPP 420, the VPP 425, the RSP 430 and the physical interfaces 410, 450. The SIP 440, in one embodiment, may provide policing, manage state information and provide a peripheral component interconnect (PCI) connection to a host computer. The SIP 440 may be a Payload-Plus™ Agere System Interface commercially available from Agere Systems, Inc.

Figure 5:
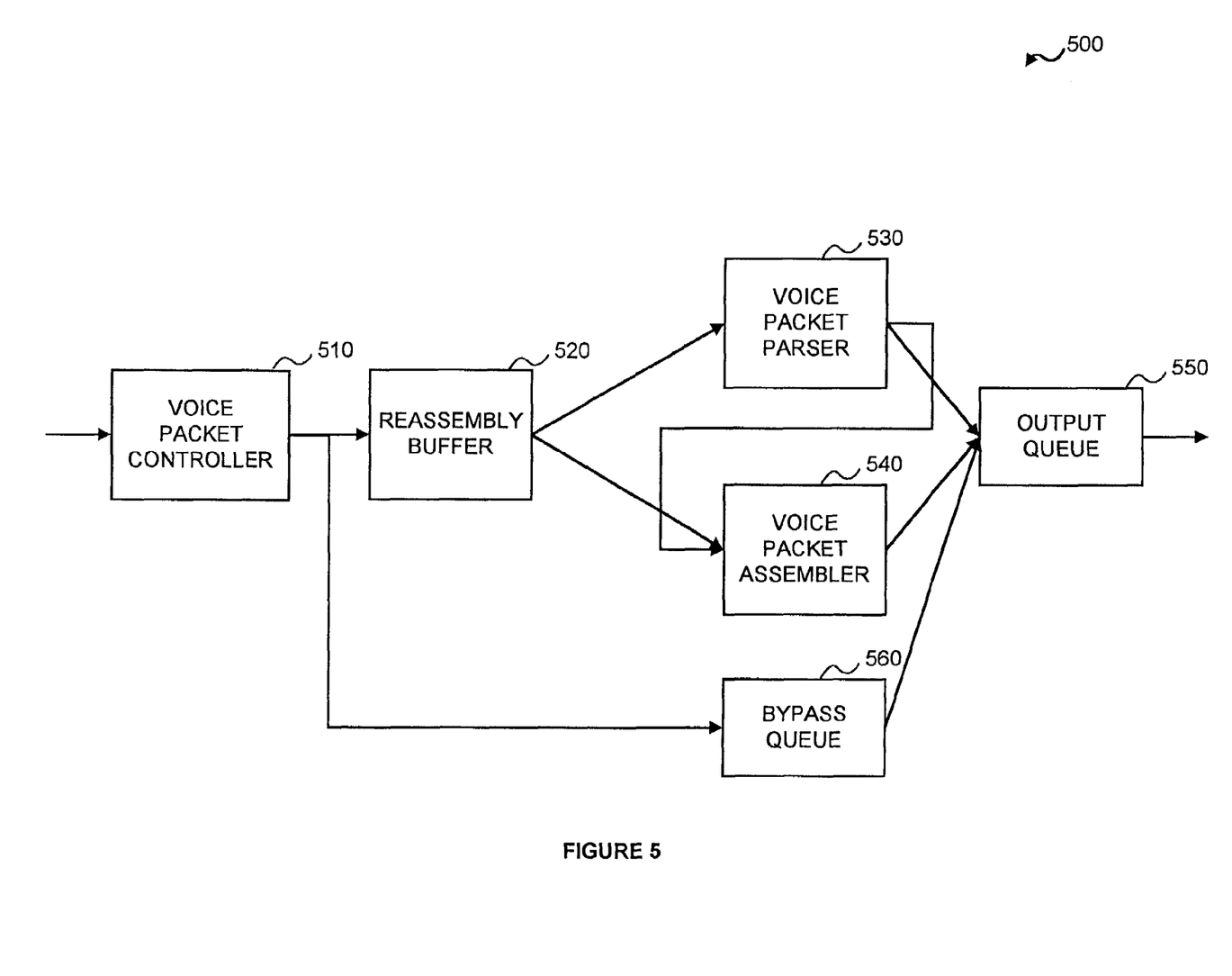
FIG. 5 illustrates a block diagram of an embodiment of a voice packet processor constructed in accordance with the principles of the present invention.

Turning now to FIG. 5, illustrated is a block diagram of an embodiment of a voice packet processor (VPP), generally designated 500, constructed in accordance with the principles of the present invention. The VPP 500 may be used with a fast pattern processor (FPP) and a routing switch processor (RSP) that receive and transmit PDUs, such as the FPP 420 and RSP 430 of FIG. 4. In another embodiment, the VPP 500 can be used with any device that can transmit and receive PDUs. For purposes of the present invention, PDUs (protocol data units) encompass CPS packets, AAL2 cells, other ATM cells or any other packets or cells that make up units of data associated with a specific protocol.

In the illustrated embodiment, the VPP 500 includes a voice packet controller 510 that is configured to receive the PDUs from the FPP and queue the PDUs for processing. The FPP may perform initial processing on the PDUs and send at least a portion of the PDUs to the voice packet controller 510. For example, the FPP may remove the ATM header of an AAL2 cell and send the AAL2 header and AAL2 payload to the voice packet controller 510. The FPP may also send a destination identification (ID) to the VPP 500 for tracking and routing of the PDUs through the VPP 500 to the RSP. The destination ID may be associated with a virtual connection of a PDU. In another embodiment, the voice packet controller 510 may receive PDUs from any device that can transmit PDUs to the VPP 500 that are AAL2 cells and/or CPS packets.

The voice packet controller 510 is also configured to bypass processing of the PDUs and send the PDUs to a bypass queue 560 if the PDUs are not AAL2 type cells or CPS packets. In another embodiment, the voice packet controller 510 is configured to bypass processing of the PDUs and send the PDUs to the bypass queue 560 if the PDUs do not contain voice data. The bypass queue 560 is a burst-matching storage queue used to hold PDUs to be transmitted to the RSP. In a related embodiment, the VPP 500 may employ a bypass destination ID to track and route PDUs to and within the bypass queue 560.

The FPP may also send a bypass indicator with each PDU sent to the voice packet controller 510. The bypass indicator indicates whether the voice packet controller 510 is to process the PDU or to bypass processing of the PDU and send the PDU to the bypass queue 560 for transmission to the RSP. The voice packet controller 510, in another embodiment, may determine a processing type for each of the PDUs and employ the processing type to queue the PDUs for processing or for bypassing processing to retransmit the PDUs unaltered to the RSP. In another embodiment, the PDUs may be transmitted unaltered to any device that is capable of receiving the PDUs.

In the illustrated embodiment, the VPP 500 also includes a reassembly buffer 520 that is configured receive PDUs from the voice packet controller 510 for processing. The reassembly buffer 520 is further configured to hold the PDUs for transmission, hold the PDUs for subsequent associated PDUs, and provide a reordering mechanism to ensure the PDUs are processed in order. For example, the reassembly buffer 520 may receive one AAL2 cell containing part of an encapsulated CPS packet and hold that AAL2 cell until an associated AAL2 cell or cells containing the remaining portion of the encapsulated CPS packet arrive before sending the cells on for processing. The reassembly buffer 520 may maintain an order based upon associated cells, based on cell type, based upon information contained within the payloads of the cells or packets, or channel number. Of course, however, the present invention is not limited to maintaining order as described above. Other types of methods are well within the broad scope of the present invention.

The VPP 500 also includes a voice packet parser 530 and a voice packet assembler 540. The voice packet parser 530 is configured to receive the PDUs tat are AAL2 cells containing voice data from the voice packet controller 510. In the illustrated embodiment, the voice packet parser 530 may receive the PDUs that are AAL2 cells containing voice data from the reassembly buffer 520. The voice packet parser 530 is further configured to parse the AAL2 cells into at least one CPS packet and transmit the at least one CPS packet to the RSP. In a related embodiment, the voice packet parser 530 may receive at least a portion of the PDUs that are AAL2 cells to parse. In another embodiment, the voice packet parser 530 may transmit the at least one CPS packet to a device that is capable of receiving CPS packets. See FIG. 2, 3A and 3B for a more detailed discussion of the structure of AAL2 cells and CPS packets.

Parsing AAL2 cells into at least one CPS packet includes extracting the information from one or more AAL2 cells to create a CPS packet. The voice packet parser 530, in one embodiment, also parses multi-packed AAL2 cells. As described previously, multi-packed AAL2 cells are AAL2 cells that contain multiple CPS packets or portions of multiple CPS packets encapsulated within one AAL2 cell. Once the voice packet parser 530 has parsed a complete CPS packet, the voice packet parser 530 may also perform error checking on that CPS packet. Also, the VPP 500 may employ a parser destination ID to track and route PDUs within the voice packet parser 530.

The voice packet assembler 540 is configured to receive the PDUs that are CPS packets from the voice packet controller 510. In the illustrated embodiment, the voice packet assembler 540 may receive the PDUs that are CPS packets from the reassembly buffer 520. The voice packet assembler 540 is further configured to assemble the CPS packets into at least one AAL2 cell and transmit the at least one AAL2 cell to the RSP. In a related embodiment, the voice packet assembler 540 may receive at least a portion of the CPS packet to assemble. In another embodiment, the voice packet assembler 540 may transmit the at least one AAL2 cell to a device that is capable of receiving AAL2 cells. See FIGS. 2, 3A and 3B for a more detailed discussion of the structure of CPS packets and AAL2 cells.

Assembling a CPS packet into at least one AAL2 cell includes creating the AAL2 header and AAL2 payload for an AAL2 cell using the CPS packet. If the CPS packet size exceeds the payload capability of an AAL2 cell, another AAL2 header and AAL2 payload for another AAL2 cell are created. Additional AAL2 cells are created until the entire CPS packet has been stored in AAL2 cells. The assembling process may also include creating an ATM header for each of the AAL2 cells. The voice packet assembler 540, in another embodiment, is further configured to assemble multi-packed AAL2 cells. Also, the VPP 500 may employ an assembler destination ID to track and route PDUs within the voice packet assembler 540.

The voice packet assembler 540 is further configured to employ a virtual connection timer to transmit the assembled AAL2 cells. When the voice packet assembler 540 fills a portion of an AAL2 cell's payload with one CPS packet and the voice packet assembler 540 has not received another CPS packet within a set time for the virtual connection associated with that CPS packet, the voice packet assembler 540 transmits that AAL2 cell. In a related embodiment, the voice packet assembler 540 pads the remaining payload of the AAL2 cell with zeros before transmitting the AAL2 cell.

The VPP 500 may advantageously employ the voice packet parser 530 to perform CPS packet switching. CPS packet switching involves the voice packet parser 530 first parsing one or more AAL2 cells into at least one CPS packet. The voice packet parser 530 then reroutes the at least one CPS packet from being transmitted to the RSP to the voice packet assembler 540. The voice packet parser 530, in one embodiment, may modify the channel identifier of the at least one CPS packet to allow for channel identifier mapping. This allows the at least one CPS packet to be switched to a new channel identifier. The voice packet assembler 540 then assembles the at least one CPS packet into one or more AAL2 cells for incorporation into an AAL2 transmission stream. The receiving device would then parse the at least one CPS packet from the one or more AAL2 cells and send the CPS packet to a new end device or channel. Of course, however, the present invention is not limited to only modifying the channel identifier. In other embodiments, other or additional information in the CPS packet or the AAL2 cell may be modified for CPS packet switching.

The VPP 500 also includes an output queue 550 that receives CPS packets from the voice packet processor 530, AAL2 cells from the voice packet assembler 540 and PDUs from the bypass queue 560. The output queue 550 may include a mux that is used to receive the CPS packets, the AAL2 cells and the PDUs, and a queue structure for transmission and rate-matching to the RSP. The output queue 550 then transmits the CPS packets, AAL2 cells and the PDUs to the RSP. In another embodiment, the output queue 550 may transmit the CPS packets, the AAL2 cells and the PDUs to a device that capable of receiving CPS packets, AAL2 cells and PDUs. Additionally, the output queue 550 may transmit destination IDs along with the CPS packets, AAL2 cells and the PDUs to the RSP. In a related embodiment, the destination ID may be a parser destination ID, an assembler destination ID, a bypass destination ID, a combination thereof or a mathematical combination. The RSP may employ the destination ID to determine the correct processing and/or routing to be performed.

Figure 6:
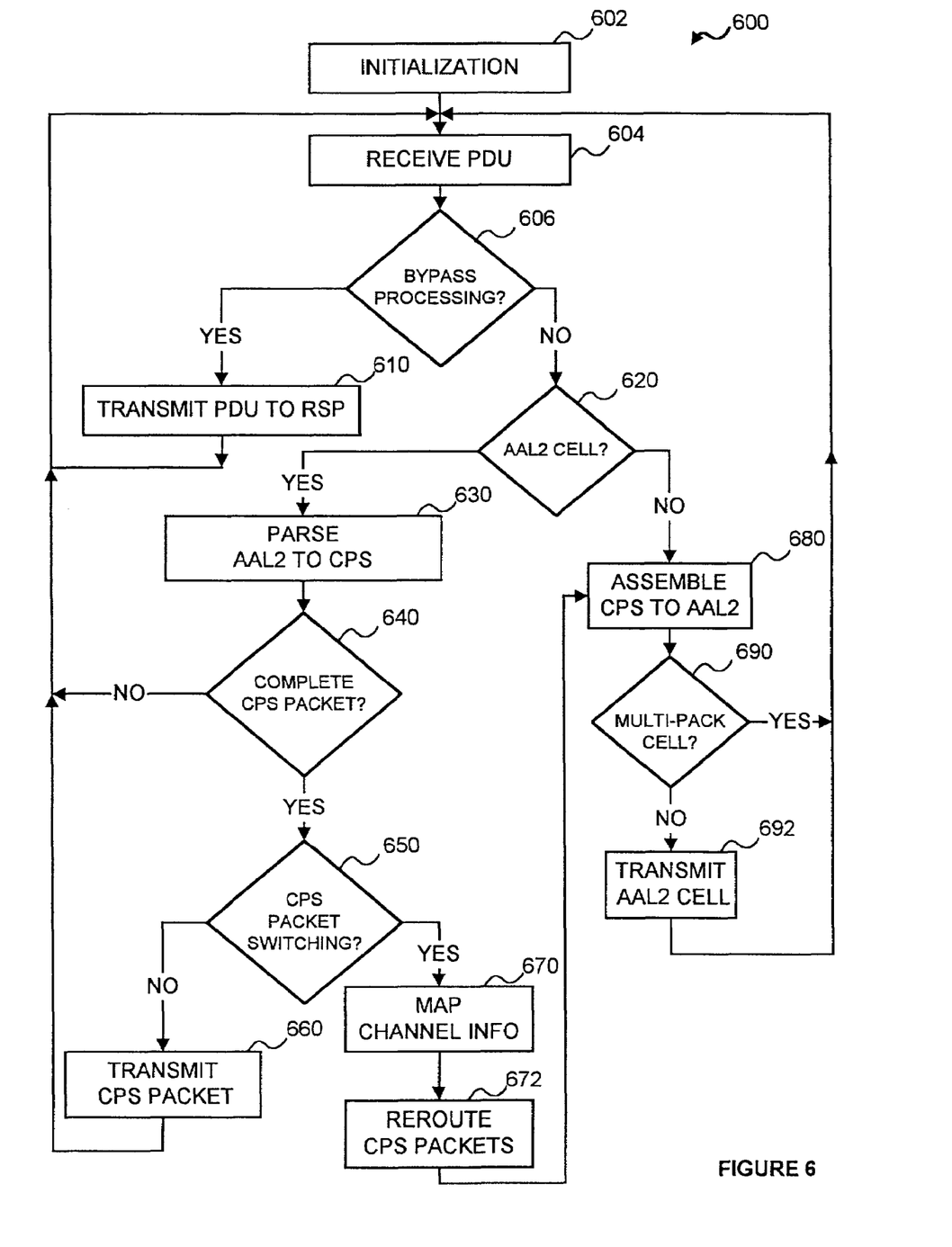
FIG. 6 illustrates a flow diagram of an embodiment of a method of operating a voice packet processor constructed in accordance with the principles of the present invention.

Turning now to FIG. 6, illustrated is a flow diagram of an embodiment of a method, generally designated 600, of operating a voice packet processor constructed in accordance with the principles of the present invention. In FIG. 6, the method 600 first performs initialization in a step 602.

After initialization, the method 600 receives a PDU in a voice packet controller from a fast pattern processor (FPP), such as the FPP of FIG. 4, and queues the PDU for processing in a step 640. The method 600 then determines if it is to bypass processing in a decisional step 606. In one embodiment, the FPP sends a bypass indicator that is employed by the voice packet controller to indicate that the PDU is to bypass processing. In another embodiment, bypassing the processing is performed if the PDU is not an AAL2 type cell or a CPS packet. In yet another embodiment, bypassing the processing is performed if the PDU does not contain voice data. Next, the method 600 transmits the bypassed PDU to a routing switch processor (RSP), such as the RSP of FIG. 4, in a step 610. The method 600 then returns to receive another PDU in the step 604.

If the PDU is not to be bypassed as determined in the decisional step 606, the method 600 then determines if the PDU is an AAL2 cell in a decisional step 620. If the PDU is an AAL2 cell, a voice packet processor receives the PDU that is an AAL2 cell from the voice packet controller in a step 630. The voice packet parser parses the AAL2 cell into at least one CPS packet. In a related embodiment, the voice packet parser may parse multi-packed AAL2 cells into multiple CPS packets. Next, the method 600 determines if the at least one CPS packet is complete in a decisional step 640. This may include parsing multiple AAL2 cells to make one CPS packet since a single CPS packet's payload can be larger than the payload of the AAL2 cell. If the at least one CPS packet is not complete, the method 600 returns to receive another AAL2 cell in the step 604.

If the at least one CPS packet is complete, the method 600 then determines if CPS packet switching is to be performed in a decisional step 650. If CPS packet switching is not to be performed, the voice packet parser then transmits the at least one CPS packet to the RSP in a step 660. Next, the method 600 returns to receive another PDU in the step 604. If CPS packet switching is to be performed, the voice packet parser may modify the channel identifier of the at least one CPS packet to allow for channel identifier mapping in a step 670. In other embodiments, the voice packet parser may map other information of the CPS packet header to new information for CPS packet switching. Then, the voice packet parser reroutes the at least one CPS packet in a step 672 to have the at least one CPS packet assembled into at least one AAL2 cell in a step 680.

If the PDU is not an ALL2 cell as determined in the decisional step 620 or the voice packet parser was performing CPS packet switching, a voice packet assembler receives the PDUs that are CPS packets and assembles the CPS packets into at least one AAL2 cell in the step 680. Next, the method 600 determines if the voice packet assembler is to create a multi-packed AAL2 cell in a decisional step 690. As previously discussed, a multi-packed AAL2 cell is an AAL2 cell with a payload that is partially filled and another CPS packet may be used to fill the remaining portion of the AAL2 cell's payload. If the at least one AAL2 cell is to be a multi-packed cell, the method 600 then returns to receive another CPS packet in the step 604. If the at least one AAL2 cell is not to be a multi-packed AAL2 cell, the voice packet assembler then transmits the at least one AAL2 cell to the RSP in a step 692. Next, the method 600 returns to receive another PDU to process is the step 604.

One skilled in the art should know that the present invention is not limited to processing PDU one type at a time. The present invention may perform parallel processing of AAL2 cells, CPS packets and bypassing. Also, other embodiments of the present invention may have additional or fewer steps than described above.

Although the present invention has been described in detail, those skilled in the art should understand that they can make various changes, substitutions and alterations herein without departing from the spirit and scope of the invention in its broadest form.

What is claimed is:

1. For use with voice applications employing a fast pattern processor and a routing switch processor that receive and transmit protocol data units (PDUs), a voice packet processor, comprising:
   a voice packet controller configured to receive said PDUs from said fast pattern processor and queue said PDUs for processing;
   a voice packet parser configured to receive said PDUs that are Asynchronous Transfer Mode (ATM) adaptation layer 2 (AAL2) cells containing voice data from said voice packet controller, parse said AAL2 cells into at least one Common Part Sublayer (CPS) packet, reroute at least one CPS packet from said routing switch processor to said voice packet assembler for incorporation into an AAL2 transmission stream, modify a channel identifier of said at least one CPS packet to allow for channel identifier mapping, and transmit said at least one CPS packet to said routing switch processor; and
   a voice packet assembler configured to receive said PDUs that are CPS packets from said voice packet controller, assemble said CPS packets into at least one AAL2 Cell and transmit said at least one AAL2 cell to said routing switch processor.

2. The voice packet processor of claim 1 wherein said voice packet controller is further configured to bypass processing and retransmit said PDUs to said routing switch processor if said PDUs are not AAL2 type cells or CPS packets.

3. The voice packet processor of claim 1 wherein said voice packet controller is further configured to bypass processing and retransmit said PDUs to said routing switch processor if said PDUs do not contain voice data.

4. The voice packet processor of claim 1 wherein said voice packet controller is further configured to determine a processing type for each of said PDUs and employ said processing type to queue said PDUs for processing or for bypassing processing to retransmit said PDUs unaltered to said routing switch processor.

5. The voice packet processor of claim 1 wherein said voice packet assembler is further configured to employ a virtual connection timer to transmit said at least one AAL2 cell if a payload of said at least one AAL2 cell is not filled within a set time.

6. The voice packet processor of claim 1 wherein said voice packet processor employs a parser destination ID, an assembler destination ID, or a bypass destination ID to track and route PDUs from said fast pattern processor to said routing switch processor.

7. The voice packet processor of claim 1 further includes a reassembly buffer configured to hold said PDUs for transmission, hold said PDUs for subsequent associated PDUs, and provide a reordering mechanism to ensure said PDUs are processed in an order.

8. The voice packet processor of claim 1 wherein said voice packet parser and said voice packet assembler are further configured to additionally parse and assemble multi-packed AAL2 cells respectively.

9. For use with voice applications employing a fast pattern processor and a routing switch processor that receive and transmit protocol data units (PDUs), a method of operating a voice packet processor, comprising:
receiving in a voice packet controller said PDUs from said fast pattern processor and queuing said PDUs for processing;
receiving in a voice packet parser said PDUs that are Asynchronous Transfer Mode (ATM) adaptation layer 2 (AAL2) cells containing voice data from said voice packet controller, parsing said AAL2 cells into at least one Common Part Sublayer (CPS) packet, reroute at least one CPS packet from said routing switch processor to said voice packet assembler for incorporation into an AAL2 transmission stream, modify a channel identifier of said at least one CPS packet to allow for channel identifier mapping, and transmitting said at least one CPS packet to said routing switch processor; and
receiving in a voice packet assembler said PDUs that are CPS packets from said voice packet controller, assembling said CPS packets into at least one AAL2 Cell and transmitting said at least one AAL2 cell to said routing switch processor.

10. The method of claim 9 wherein said receiving in said voice packet controller further comprises bypassing processing and retransmitting said PDUs to said routing switch processor if said PDUs are not AAL2 type cells or CPS packets.

11. The method of claim 9 wherein said receiving in said voice packet controller further comprises bypassing processing and retransmitting said PDUs to said routing switch processor if said PDUs do not contain voice data.

12. The method of claim 9 wherein said receiving in said voice packet controller further comprises determining a processing type for each of said PDUs and employing said processing type to queue said PDUs for processing or for bypassing processing to retransmit said PDUs unaltered to said routing switch processor.

13. The method of claim 9 wherein said receiving in said voice packet assembler further comprises employing a virtual connection timer for transmitting said at least one AAL2 cell if a payload of said at least one AAL2 cell is not filled within a set time.

14. The method of claim 9 further comprises employing a parser destination ID, an assembler destination ID, or a bypass destination ID for tracking and routing PDUs from said fast pattern processor to said routing switch processor.

15. The method of claim 9 further comprises holding in a reassembly buffer said PDUs for transmission, holding said PDUs for subsequent associated PDUs, and providing a reordering mechanism for ensuring said PDUs are processed in an order.

16. The method of claim 9 wherein said receiving in said voice packet parser and said receiving in said voice packet assembler further comprises additionally parsing and assembling multi-packed AAL2 cells respectively.

17. A carrier class voice gateway, comprising:
a fabric interface controller that interfaces with a fabric network to send and receive Asynchronous Transfer Made (ATM) adaptation layer 2 (AAL2) cells and protocol data units (PDUs);
a digital signal processing (DSP) module that digitizes and stores received voice communications in Common Part Sublayer (CPS) packets, and converts said CPS packets to transmit voice communications; and
a packet processing system that interfaces wit said DSP module and said fabric interface controller to send and receive said CPS packets, said AAL2 cells or said PDUs, said packet processing system, including:
a fast pattern processor (FPP) that receives said CPS packets, said AAL2 cells or said PDUs, and performs pattern recognition and classification on said CPS packets, said AAL2 cells or said PDUs,
a voice packet processor, having:
a voice packet controller that receives said CPS packets, said AAL2 cells or said PDUs from said FPP, and based on a bypass indicator received from said FPP, bypasses processing and retransmits said PDUs, said CPS packets or said AAL2 cells, or queues said CPS packets, said AAL2 cells or said PDUs for processing,
a voice packet parser that receives said AAL2 cells containing voice data from said -voice packet controller, parses said AAL2 cells into at least one CPS packet and transmits said at least one CPS packet, and
a voice packet assembler that receives said CPS packets from said voice packet controller, assembles said CPS packets into at least one AAL2 cell and transmits said at least one AAL2 cell, and
a routing switch processor (RSP) that receives said at least one CPS packet, said at least one AAL2 cell or said PDUs from said voice packet processor, performs routing functions and/or traffic management, transmits said at least one CPS packet to said DSP module, and transmits said at least one AAL2 cell or said PDUs to said fabric interface controller.

18. The carrier class voice gateway of claim 17 wherein said voice packet controller, said voice packet parser and said voice packet assembler process at least a portion of said CPS packets, said AAL2 cells or said PDUs.

19. The carrier class voice gateway of claim 17 wherein said voice packet controller bypasses processing and retransmits said PDUs to said RSP if said PDUs do not contain voice data.

20. The carrier class voice gateway of claim 17 wherein said voice packet parser further performs CPS packet switching by rerouting said at least one CPS packet from said RSP to said voice packet assembler for incorporation into an AAL2 transmission stream.

21. The carrier class voice gateway of claim 20 wherein said voice packet parser further modifies the channel identifier of said at least one CPS packet to allow for channel identifier mapping.

22. The carrier class voice gateway of claim 17 wherein said voice packet assembler further employs a virtual connection timer to transmit said at least one AAL2 cell if a payload of said at least one AAL2 cell is not filled within a set time.

23. The carrier class voice gateway of claim 17 wherein said voice packet processor employs a parser destination ID, an assembler destination ID, or a bypass destination ID to track and route said CPS packets, said AAL2 cells and said PDUs from said FPP to said RSP.

24. The carrier class voice gateway of claim 17 further includes a reassembly buffer tat holds said CPS packets, said AAL2 cells or said PDUs for transmission, hold said CPS packets, said AAL2 cells or said PDUs for subsequent associated CPS packets, AAL2 cells or PDUs respectively, and provides a reordering mechanism to ensure said CPS packets, said AAL2 cells or said PDUs are processed in an order.

25. The carrier class voice gateway of claim 17 wherein said voice packet parser and said voice packet assembler further parse and assemble multi-packed AAL2 cells respectively.

26. For use with voice applications employing protocol data units (PDUs), a voice packet processor, comprising:
a voice packet controller configured to receive said PDUs and queue said PDUs for processing;
a voice packet parser configured to receive said PDUs tat are Asynchronous Transfer Mode (ATM) adaptation layer 2 (AAL2) cells containing voice data from said voice packet controller, parse said AAL2 cells into at least one Common Part Sublayer (CPS) packet, reroute at least one CPS racket from said routing switch processor to said voice packet assembler for incorporation into an AAL2 transmission stream, modify a channel identifier of said at least one CPS packet to allow for channel identifier mapping, and transmit said at least one CPS packet; and
a voice packet assembler configured to receive said PDUs that are CPS packets from said voice packet controller, assemble said CPS packets into at least one AAL2 Cell and transmit said at least one AAL2 cell.

27. The voice packet processor of claim 26 wherein said voice packet controller is further configured to bypass processing and retransmit said PDUs if said PDUs are not AAL2 type cells or CPS packets.

28. The voice packet processor of claim 26 wherein said voice packet controller is further configured to bypass processing and retransmit said PDUs if said PDUs do not contain voice data.

29. The voice packet processor of claim 26 wherein said voice packet controller is further configured to determine a processing type for each of said PDUs and employ said processing type to queue said PDUs for processing or for bypassing processing to retransmit said PDUs unaltered.

30. The voice packet processor of claim 26 wherein said voice packet assembler is further configured to employ a virtual connection timer to transmit said at least one AAL2 cell if a payload of said at least one AAL2 cell is not filled within a set time.

31. The voice packet processor of claim 26 wherein said voice packet processor employs a parser destination ID, an assembler destination ID, or a bypass destination ID to track and route PDUs through said voice packet processor.

32. The voice packet processor of claim 26 further includes a reassembly buffer configured to hold said PDUs for transmission, hold said PDUs for subsequent associated PDUs, and provide a reordering mechanism to ensure said PDUs are processed in an order.

33. The voice packet processor of claim 26 wherein said voice packet parser and said voice packet assembler are further configured to additionally parse and assemble multi-packed AAL2 cells respectively.

* * * * *